US007010159B2

(12) United States Patent
Ali

(10) Patent No.: US 7,010,159 B2
(45) Date of Patent: Mar. 7, 2006

(54) APPARATUS AND METHOD FOR COMBINING RANDOM SET OF VIDEO FEATURES IN A NON-LINEAR SCHEME TO BEST DESCRIBE PERCEPTUAL QUALITY OF VIDEO SEQUENCES USING HEURISTIC SEARCH METHODOLOGY

(75) Inventor: Walid S. I. Ali, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 736 days.

(21) Appl. No.: 09/938,377

(22) Filed: Aug. 24, 2001

(65) Prior Publication Data

US 2003/0012426 A1 Jan. 16, 2003

Related U.S. Application Data

(60) Provisional application No. 60/286,352, filed on Apr. 25, 2001.

(51) Int. Cl.
*G06K 9/62* (2006.01)

(52) U.S. Cl. .......................... 382/155; 382/278; 706/13

(58) Field of Classification Search ........ 382/155–160, 382/112, 278, 228, 254, 286; 706/12–16, 706/25; 700/47, 48; 702/81–84, 179, 182, 702/194, 66–69; 348/92, 93, 180, 192, 193, 348/438.1, 455

See application file for complete search history.

(56) References Cited

U.S. PATENT DOCUMENTS

| | | | | |
|---|---|---|---|---|
| 5,390,283 | A * | 2/1995 | Eshelman et al. ............ | 706/13 |
| 5,446,492 | A * | 8/1995 | Wolf et al. ................. | 348/192 |
| 6,496,221 | B1 * | 12/2002 | Wolf et al. ................. | 348/192 |
| 6,798,919 | B1 * | 9/2004 | Ali et al. .................... | 382/272 |

OTHER PUBLICATIONS

Corriveau et al., 4th Video Quality Experts Group Meeting, Communications Research Centre, Ottawa Canada, Mar. 13-17, 2000.*

(Continued)

*Primary Examiner*—Samir Ahmed
(74) *Attorney, Agent, or Firm*—Edward W. Goodman

(57) ABSTRACT

A method for combining a random set of video features non-linearly to evaluate perceptual quality of video sequences includes (a) receiving a video sequence for image quality evaluation; (b) providing an objective metric image quality controller comprising a random set of metrics ranging from $M_1$ to $M_n$ without dependency information for each one metric; (c) applying each one metric individually to the video sequence to provide an individual objective scoring value of the video sequence ranging from $x_1$ to $x_n$; (d) determining a plurality of sets of weights ($w_1$ to $w_n$) which correlate to predetermined subjective evaluations of image quality for a predetermined plurality of video sequences (n), each one set of weights being assigned a range having an incremental value equal to the range divided by a number of combinations for each one set of weights; (e) weighting each individual objective scoring value $x_1$ to $x_n$ provided by each one metric of the random set of metrics in step (c); (f) combining metrics of the weighted individual objective scoring value of the random set of metrics into a single objective evaluation F, wherein each weighted individual scoring value from step (e) is multiplied by each individual objective scoring value $x_1$ to $x_n$ from step (c); (g) calculating a correlation factor R to provide a correlation value for the objective evaluation F and the plurality of video sequences (n). Steps (e), (f) and (g) are repeated to provide a plurality of correlation factors which are ranked. A heuristic search uses a genetic algorithm to find the best set of weights to provide objective scores closest to predetermined subjective evaluations. A system provides the hardware and modules that perform the non-linear combination of metrics to provide enhanced perceptual image information.

34 Claims, 5 Drawing Sheets

OTHER PUBLICATIONS

Inazumi et al., "Quality Evaluation Method Considering Time Transition of Coded Video Quality," IEEE 1999, pp. 338-342.*

Wolf et al., "Future Work Relating Objective and Subjective Telecommunications System Performance," IEEE 1991, pp. 2129-2134.*

Voran, "The Development of Objective Video Quality Measures that Emulate Human Perception," IEEE 1991, pp. 1776-1781.*

Wu et al., "Digital Video Quality Evaluation Using Quantitative Quality Metrics," IEEE 1998, pp. 1013-1016.*

Winkler, "Visual Quality Assessment Using a Contrast Gain Control Model," IEEE 1999, pp. 527-532.*

* cited by examiner

170 — REPEATING STEPS (140), (150) AND (160) FOR EACH SET OF WEIGHTS PROVIDED IN STEP (130) TO DETERMINE A PLURALITY OF CORRELATION FACTORS R;

180 — RANKING SAID PLURALITY OF CORRELATION FACTORS R, WHEREIN A PARTICULAR CORRELATION FACTOR OF SAID PLURALITY OF CORRELATION FACTORS HAVING A PARTICULAR CORRELATION VALUE CLOSEST TO 1 REPRESENTS A BEST RANKING OF THE RESPECTIVE COMBINED METRICS IN STEP (140) FOR EACH SET OF WEIGHTS;

190 — PROVIDING IMAGE QUALITY INFORMATION TO AT LEAST ONE OF A SYSTEM OPTIMIZER AND THE VIDEO PROCESSING MODULE AS TO THE BEST RANKING OF THE RESPECTIVE COMBINED METRICS OBTAINED IN STEP (i) TO PROVIDE A BEST PERCEPTUAL IMAGE QUALITY

FIG. 1B

WHEN A PREDETERMINED NUMBER OF SETS OF METRICS = n, THE QUADRATIC MODEL TO OBTAIN THE OBJECTIVE EVALUATION F IS:

$$F = \left(\sum_{i=1}^{n} w_i x_i\right)^2,$$ WHEREIN "n" IS A NON-ZERO VALUE.

FIG. 1C

WHEN A NUMBER OF THE SET OF METRICS = 4, THEN THE QUADRATIC MODEL TO OBTAIN THE OBJECTIVE EVALUATION F IS:

/190 selecting a best set of weights from the plurality of sets of weights provided in step (130), said best set of weights being heuristically determined by a genetic algorithm that increases dynamically a size of the assigned range of said each one set of weights provided in step (130).

FIG. 1F

/200 selecting a best set of weights from the plurality of sets of weights provided in step (130), said best set of weights being heuristically determined by a genetic algorithm that enables finding the best solution that maximizes the correlation factor R of the overall objective image quality F with the subjective evaluation without the need to carry out an exhaustive search to find the best set of weights.

FIG. 2

Calculating of the correlation factor R in step (160) by using a Spearman rank order comprising the following equation:

$$R = 1 - \frac{6 * (X-Y)^t (X-Y)}{k(k^2-1)}$$

wherein X is equal to a vector of ranked $k$ objective values for the $k$ sequences ($k * 1$), and Y is equal to a vector of ranked $k$ subjective evaluation for the $k$ sequences ($k * 1$).

APPARATUS AND METHOD FOR COMBINING RANDOM SET OF VIDEO FEATURES IN A NON-LINEAR SCHEME TO BEST DESCRIBE PERCEPTUAL QUALITY OF VIDEO SEQUENCES USING HEURISTIC SEARCH METHODOLOGY

This application claims priority from provisional application No. 60/286,352 filed Apr. 25, 2001.

BACKGROUND OF THE INVENTION

1. Field of the Invention

The present invention relates to apparatuses and methods for the automatic evaluation of the perceived video quality.

2. Description of the Related Art

Deciding on the perceptual image quality for video sequences automatically is of great importance for quality-of-service (QoS) distribution, broadcasting and for consumer-electronics manufacturers.

Conventionally, perceived video quality is assessed subjectively. Although expert viewers may notice imperfections in quality, such as artifacts, the general public often does not. Accordingly, as the general public is the majority of purchasers of consumer-electronics, the manufacturers, broadcasters and distributors continually strive to appeal to this group in terms of quality.

Subject assessment of video quality is a time consuming process with inconsistent results at best. Panels of viewers will rate the same video sequences differently. In fact, the same panel of viewers may rate the same video sequence differently each time. Thus, pure subjective assessment of video quality requires statistical analysis in an attempt to remove ambiguities of subjective assessment.

Accordingly, objective evaluation methods are preferred because of their consistent results. Such evaluation methods are automated to quickly evaluate video quality and to quantify the merit of the video quality. Of course, there must be a correlation of the objective methods with predetermined subjective standards of quality because it is the viewer who will ultimately judge quality according to subjective terms.

Objective evaluation methods utilize metrics to quantify video quality. Metrics are sets of measurements, which in a video sense, comprise a set of automated parameters for a measurement of a certain objective or objectives. For example, there can be metrics for measuring distortion, artifacts of images, artifacts near edges of images, color perception, contrast sensitivity, spatial and temporal channels, just to name a few.

The final determinant for the quality of these automatic video-quality measuring metrics is its degree of correlation with subjective evaluation; the higher the correlation, the better the metric.

Different objective video quality metrics have been proposed, which vary widely according to:

Performance regarding how much they correlate with subjective quality assessment results;

Stability, in that some models excel when certain kinds of artifacts are encountered (e.g. blocking, corner artifacts in MPEG decoding), but they degrade significantly when applied to other kinds of artifacts; and Complexity, wherein a number of models rely on complicated human vision system (HVS) simulation, which required a lot of computation power, whereas other models rely on very simple calculations (e.g. signal to noise ratio).

Obviously, relying on a single metric would restrict the evaluation to the advantages and disadvantages of the particular single metric.

Accordingly, there is a need to use a different objective video quality metrics instead of a single one. Previously, a linear combination of objective video quality metrics has been used to mimic the subjective evaluation of video quality. Such a linear combination assumes that the different metrics are independent of each other, and consequently could be fused by a linear model.

SUMMARY OF THE INVENTION

The present invention provides an apparatus and method for combining a random set of video features in a non-linear combination to best describe the perceptual quality of video sequences using heuristic search technology.

According to a method of the present invention, a plurality of different metrics are combined without any prior-knowledge about their independence.

A method for providing a composite objective image quality metric of a set of a plurality of random video features may comprise the steps of:

(a) receiving a video sequence for image quality evaluation;

(b) providing an objective metric image quality controller comprising a random set of metrics ranging from $M_1$ to $M_n$ without cross correlation information;

(c) applying said each one metric of said set of metrics individually to said video sequence so that said each one metric of said random set of metrics provides an individual objective scoring value of said video sequence ranging from $x_1$ to $x_n$;

(d) determining a plurality of sets of weights ($w_1$ to $w_n$) which correlate to predetermined subjective evaluations of image quality for a predetermined plurality of video sequences (n), each one set of weights of said plurality of sets of weights being assigned a range having an incremental value equal to said range divided by a number of combinations for said each one set of weights;

(e) weighting by said each one set of weights each individual objective scoring value $x_1$ to $x_n$ provided by said each one metric of said random set of metrics in step (c);

(f) adding the weighted individual objective scoring values of said random set of metrics into a single objective evaluation F, wherein each weighted individual scoring value from step (e) is multiplied by each individual objective scoring value $x_1$ to $x_n$ from step (c);

(g) calculating a correlation factor R to provide a correlation value for the objective evaluation F and the plurality of video sequences (n);

(h) repeating steps (e), (f) and (g) for each set of weights provided in step (d) to determine a plurality of correlation factors R;

(i) ranking said plurality of correlation factors R, wherein a particular correlation factor of said plurality of correlation factors having a particular correlation value closest to 1 represents a best ranking of the respective combined metrics in step (e) for each set of weights; and (j) providing image quality information to at least one of a system optimizer and the video processing module as to the best ranking of the respective combined metrics obtained in step (i) to provide a best perceptual image quality.

The method may perform the combining recited in step (f) non-linearly by (e.g.) a quadratic model to obtain the objective evaluation F.

If, e.g., the method contains a fixed number of metrics being a total of four, then the quadratic model to obtain the objective evaluation F is:

$$F = w_1x_1 + w_2x_2 + w_3x_3 + w_4x_4 + w_5x_1x_2 + \\ w_6x_1x_3 + w_7x_1x_4 + w_8x_2^2x_3 + w_9x_2^2x_4 + w_{10}^2x_3x_4^2.$$

The method may have any predetermined number of sets of metrics=n, and the quadratic model to obtain the objective evaluation F is:

$$F = \left(\sum_{i=1}^{n} w_i x_i\right)^2,$$

wherein "$n$" is a non-zero value.

The method may have any predetermined number of sets of metrics=n, and any polynomial degree could be used for the non-linear combination (instead of a quadratic), say, an Lth order, to obtain the objective evaluation F is:

$$F = \left(\sum_{i=1}^{n} w_i x_i\right)^L,$$

wherein "$n$" is a non-zero value.

The method may calculate the correlation factor R in step (g) by using a Spearman rank order comprising the following equation:

$$R = 1 - \frac{6*(X-Y)^t(X-Y)}{k(k^2-1)},$$

wherein X is equal to a vector of ranked k objective values for the k sequences (k*1), and
Y is equal to a vector of ranked k subjective evaluation for the k sequences (k*1).

The method may further comprise:

(k) selecting a best set of weights from the plurality of sets of weights provided in step (d), said best set of weights being heuristically determined by a genetic algorithm that increases dynamically a size of the assigned range of said each one set of weights provided in step (d).

The method may also further comprise:

(k) selecting a best set of weights from the plurality of sets of weights provided in step (d), said best set of weights being heuristically determined by a genetic algorithm that enables finding the best solution (the one that maximizes the correlation factor R of the overall objective image quality F with the subjective evaluation) without the need to carry out an exhaustive search to find the best set of weights.

A system for providing a composite image of a random set of video features may comprise:

means for receiving a video sequence;

an objective metric image quality controller comprising a plurality of objective metrics without prior dependency information thereof and means for selecting a metric from said plurality of objective metrics for evaluating image quality of the video sequence, and means for applying each of said plurality of objective metrics by said objective metric image quality controller to said video sequence and individually scoring said video sequence from $x_1$ to $x_n$;

means for determining a plurality of sets of weights ($w_1$ to $w_n$) by said objective metric image quality controller, said plurality of sets of weights correlate to predetermined subjective evaluations of image quality for a predetermined plurality of video sequences (n), each one set of weights being assigned a range having an incremental value equal to a value of said range divided by a number of combinations for said each one set of weights, which includes means for weighting by said each one set of weights each individual objective scoring value $x_1$ to $x_n$ provided by said each one metric of said random set of metrics;

means for combining metrics of the weighted individual objective scoring values of said random set of metrics into a single objective evaluation F, wherein each weighted individual scoring value is multiplied by each individual objective scoring value $x_1$ to $x_n$;

means for calculating a plurality of correlation factors R to provide a correlation value for the objective evaluation F and the plurality of video sequences (n), which includes means for ranking said plurality of correlation factors R, wherein a particular correlation factor of said plurality of correlation factors having a particular correlation value closest to 1 represents a best ranked respective combined metrics for each set of weights;

wherein the best ranked respective combined metrics determined by said objective metric image quality controller is used to provide a best objective perceptual quality of said video sequence.

The means for combining metrics can include means for non-linear combination by a quadratic model to obtain the objective evaluation F.

The means for calculating the plurality of correlation factors R includes using a Spearman rank order comprising:

$$R = 1 - \frac{6*(X-Y)^t(X-Y)}{k(k^2-1)},$$

wherein X is equal to a vector of ranked k objective values for the k sequences (k*1), and
Y is equal to a vector of ranked k subjective evaluation for the k sequences (k*1).

The means for determining may include means for selecting a best set of weights from the plurality of sets of weights, said best set of weights being heuristically determined by a genetic algorithm that increases dynamically a size of the assigned range of said each one set of weights.

The means for determining may include means for selecting a best set of weights from the plurality of sets of weights, said best set of weights being heuristically determined by a genetic algorithm that provides additional weights to said each one set to increase precision by increasing a quantity of increments for said each one set of weights.

BRIEF DESCRIPTION OF THE DRAWINGS

FIGS. 1A–1F are flowcharts providing an overview of the method according to the present invention.

FIG. 2 illustrates on that calculation of the correlation factor R may be performed according to the present invention.

DETAILED DESCRIPTION OF THE INVENTION

The following description, by way of illustration and not by limitation, describes the method and apparatus of the present invention. It is understood by persons of ordinary skill in the art that there modifications which may be made to the following description that are within the spirit of the present invention and the scope of the appended claims.

Figure 1A:
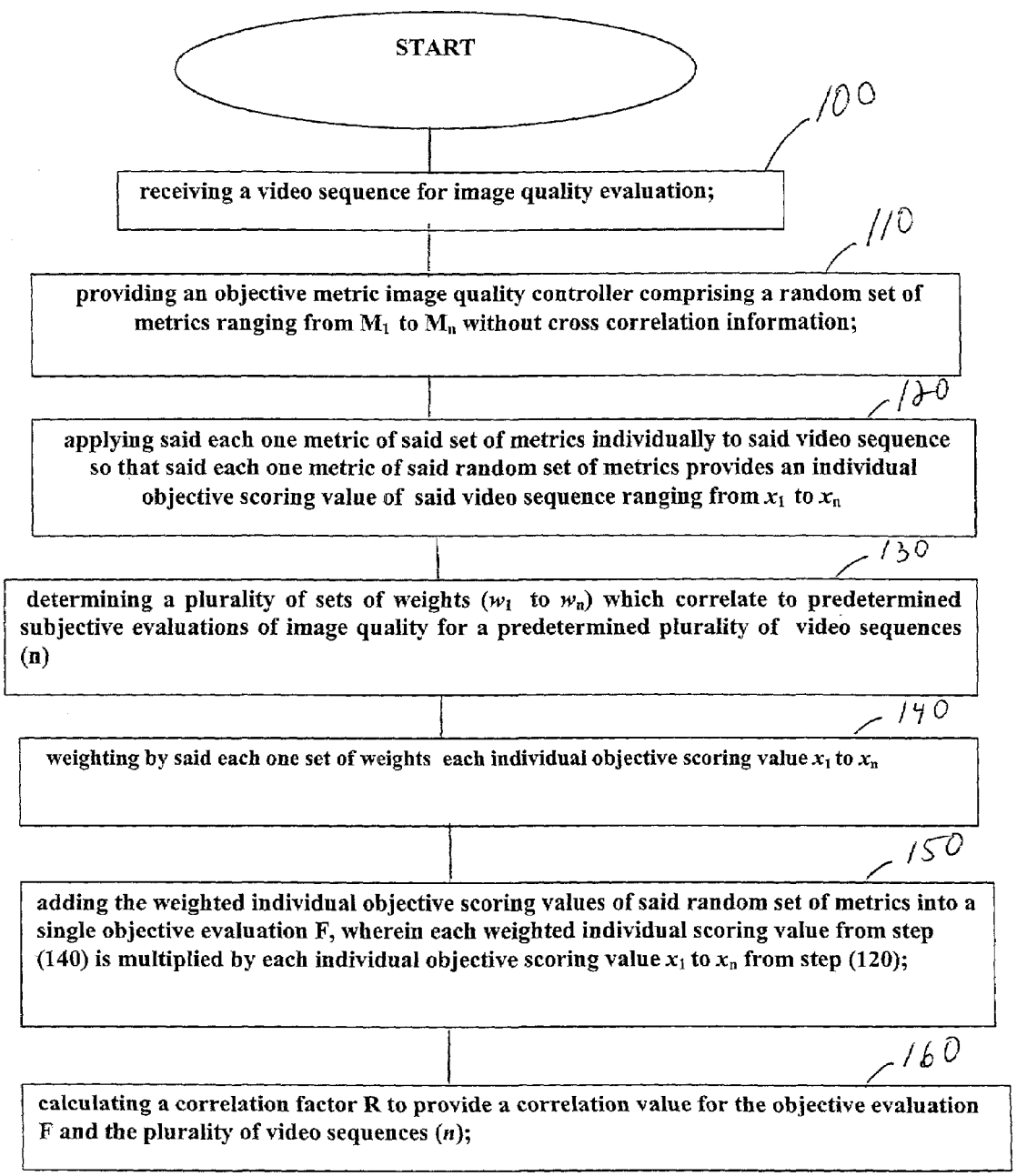

FIG. 1A is a flowchart providing an overview of the method of practicing the present invention.

At step 100, a video sequence is received for image quality evaluation. Initially, a video sequence (i.e. video stream) could be from a plurality of sources, including but not limited to a broadcast, a satellite transmission, reproduction from a VHS, DVD, downloaded video from the Internet, TIVO reproduction, etc. The video sequence may be any MPEG or other known protocol, or it could be a future protocol. The emphasis is on providing enhanced image quality for the received video sequence, not necessarily requiring a particular type of video sequence.

At step 110 an objective image quality controller is provided. The objective image quality controller includes a random set of metrics ranging from, for example, $M_1$ to $M_n$. There may not be dependency information provided for the random set of metrics. Any previous attempt to use metrics to enhance video quality assumed that the metrics would be independent of each other, and subsequently would be fused by a linear model. Interdependent and dependent metrics complicate their possible combination, and a linear model would not provide successful results.

At step 120, each one of the metrics is applied individually to the video sequence, so that an individual objective scoring value is obtained. For example, this objective scoring value may range from $x_1$ to $x_n$, with the number of metrics in the set being determinative of the value of "n". For explanatory purposes, an example is used where the number of metrics is four, but the present invention is not limited to four, or even four hundred or four thousand metrics for that matter. As computation resources improve in the future, the number of metrics used may be larger than the numbers discussed, but the basic principal behind their combination does not change from the method of the present invention.

At step 130, there is a determination of a plurality of sets of weights $w_1$ to $w_n$ which correlate to predetermined subjective evaluations of image quality for a predetermined plurality of video sequences (n).

In order for an objective system to provide a quality evaluation that is practical, a correlation with subjective evaluation is necessary, as the potential end users and purchasers of the products will use subject evaluation of the image quality as a basis to make a purchase, or additional purchases, or compare with other products. Of course, subjective evaluation has known inconsistency problems, such as whether the viewer is a lay person or an expert, and both groups sometimes rate the same sequence differently.

Accordingly, subjective evaluation models requires statistical analysis to ensure accuracy, and objective evaluation systems, which automatically rate and provide feedback for adjustment of real time systems, correlate to known values of subjective evaluation as closely as possible. Thus, the correlation in step 130 to predetermined sequences of subjective evaluation can be any values that deemed to be desirable, according to need.

At step 140, there is a weighting of the objective scoring values $x_1$ to $x_n$, which is provided by each metric of the random set of metrics. For example, assuming (n) sequences, and say four metrics, each metric will score the (n) sequences differently (there would be nsets of the quadruplets $x_1$, $x_2$, $x_3$ and $x_4$. A best set of weights may be found, which is discussed infra at steps 200 and 210, shown in FIGS. 1E and 1F.

At step 150, there is a combining of the metrics of the weighted individual scoring values into a single objective evaluation F, wherein each weighted individual scoring value from step 140 is multiplied by the objective scoring value $x_1$ to $x_n$ from step 120.

For explanatory purposes only, when the number of metrics is, for example, 4, FIG. 1C shows an example of a non-linear quadratic model of all the values to be combined for just four metrics. However, persons of ordinary skill in the art should understand that the present invention is not limited to a particular version of metrics, nor is it limited to the use of non-linear quadratic models. For example, a polynomial degree for non-linear combination to an Lth order and the evaluation F can be obtained according to:

$$F = \left(\sum_{i=1}^{n} w_i x_i\right)^L$$

wherein "$n$" is a non-zero value. FIG. 1D shows a more general equation in that there are n number of metrics, so the quadratic model would be for n number of metrics.

At step 160, a correlation factor R is calculated to provide a correlation value for the objective evaluation F from the combined metrics in step 150 and the predetermined subjective evaluation of the plurality of video sequences (n).

At step 170 (shown in FIG. 1B), Genetic Algorithms are used to find the best set of weights by choosing to repeat some but not all of the possible combinations that could be obtained by repeating cycle of steps 140, 150 and 160 for each set of weights provided in step ) 130 to determine a plurality of correlation factors R.

The genetic algorithm may comprise a chromosome having a number of genes corresponding to quantity of said plurality of sets of weights in step 130, and each gene of said number of genes being represented by a quantity of bits sufficient to represent all possible tested values for said each one weight in binary, wherein all possible tested values being equal to an absolute value of the assigned range for said each one set of weights provided in step 130 divided by the incremental value for said each one set of weights.

The genetic algorithm may alter a bit pattern of the chromosome by at least one of mutation and crossover while minimizing a deviation in the correlation factor R, so that a best solution comprises a deviation closest to zero.

At step 180, there is a ranking of the plurality of correlation factor R determined in step 170, wherein a particular correlation factor having a value closest to 1 represents a best ranking of the respective combined metrics in step 140 for each set of weights.

At step 190, the image quality information is provided to at least one of a system optimizer and the video processing module as to the best ranking of the respective combined metrics obtained in step (i) to provide a best perceptual image quality. The information may be used by the optimizer and or video processing module to adjust processing to bring the evaluation within a certain range of scores.

As previously mentioned, FIGS. 1E and 1F provide an additional step for selecting a best set of weights of the plurality of sets of weights provided in step 130.

In order to find a best set of weights (for example, using the example of four metrics, there would be ten weights per set $w_1$ to $w_{10}$) a hypothetical range for each weight will be assigned (for example from −1000 to +1000 with an increment of 0.125). Thus, per sequence, there will be (2000/0.125)*10 weights=160,000 possible combinations.

When applying one of these possible combinations to the k sequences, for which there is a vector Y of ranked k subjective evaluation for the k sequences (its dimension=k*1), there is a vector X of ranked k objective values (its dimension=k*1). The correlation factor R between the subjective vector Y and the objective vector X is calculated using, for example, a Spearman rank order to avoid any linearity assumption in the modeling. The Spearman rank provides a correlation of how well objective vector matches the subjective vector, and is calculated by:

$$R = 1 - \frac{6*(X-Y)^t(X-Y)}{k(k^2-1)},$$

wherein X is equal to a vector of k objective values for the k sequences (k*1), and
  Y is equal to a vector of k subjective evaluation for the k sequences (k*1).

In order to find the best combination of weights through exhaustive search, there must be 16,000*n weights to find the best set of weights. In addition, the number of possible combinations could be greatly increased by:
  increasing the dynamic range for the weight search (e.g. was −1000 to 1000, this numbers could both be greatly increased);
  increasing the precision of the search (e.g. instead of 0.125, it could be 0.0125, or 0.000125, or even smaller);
  increasing the number of metrics in the random set (the example was based on four metrics, but there could be a hundred metrics, or a thousand, or more);

As disclosed above, the number of possible combinations poses a challenge that may be best determined heuristically. For example, a genetic algorithm that can efficiently search for combination to find the sets of weights that best correlate with the subjective evaluation. Genetic algorithms are suitable for this search problem due to their capacity to jump out of the local optima when looking for a global optima.

In a genetic algorithm, there are iterative procedures that maintain a population of candidate solutions encoded in the form of chromosomes. The initial population of candidate solutions can be selected heuristically or randomly. A chromosome defines each candidate solution in a generation. For each generation, each candidate solution is evaluated and assigned a fitness value. The fitness value is generally a function of the decoded bits contained in each candidate solution's chromosome. These candidate solutions will be elected for reproduction in the next generation based on their fitness values. The fitness value in the present invention would be provided by the objective metric image quality controller.

The selected candidate solutions are combined using a genetic recombination operation known as "cross over." The cross over operator exchanges portions of bits of chromosomes to hopefully produce better candidate solutions with higher fitness for the next generation.

A "mutation" is then applied to perturb the bits of chromosomes in order to guarantee that the probability of searching a particular subspace of the problem space is never zero. The mutation also prevents the genetic algorithm from becoming trapped on local optima, which is particularly useful when used in the present invention. The article entitled "Parallel Genetic Algorithms" by A. Chipperfield and P. Fleming, *Parallel and Distributed Computing Handbook*, by A. Y. H. Zomaya, McGraw Hill, New York, pages 1118–1143 (1996 is hereby incorporated by reference as background material regarding genetic algorithms. In addition, the article entitled "Genetic Algorithms in Optimization and Adaptation" by P. Husbands, on pages 227–276 of the book *Advances in Parallel Algorithms* by L. Kronsjo and D. Shumsheruddin (Editors) Blackwell Scientific, Boston Mass., (1990) is also hereby incorporated by reference as background material on genetic algorithms.

Figure 3:
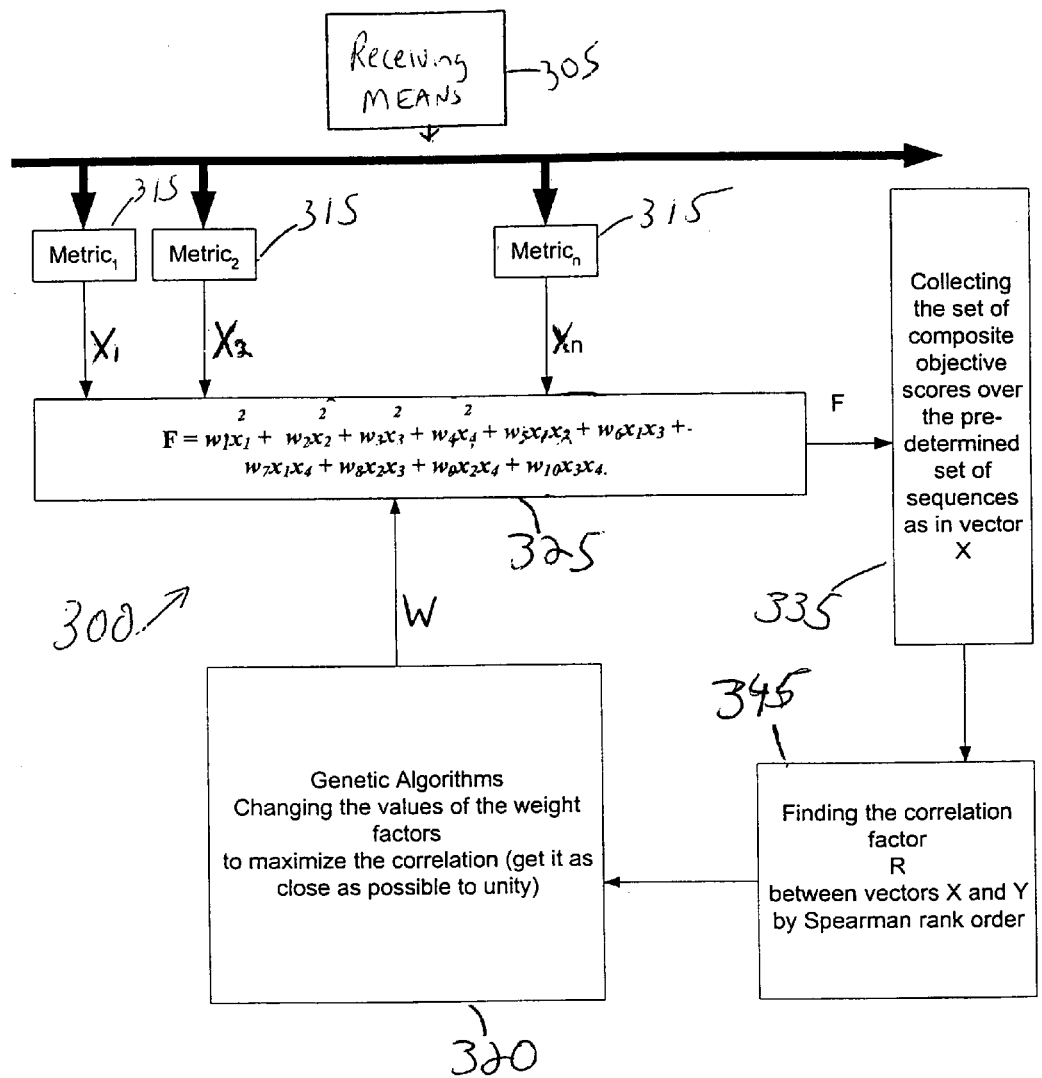
FIG. 3 illustrates a diagram of a system of the present invention.

The search process continues by altering the bit pattern of the chromosome by mutation and crossover while minimizing the deviation in the correlation factor R. The best solution would be the one giving a deviation of zero, where Deviation=1−R, and (R would be equal to 1). However, for practical reasons, the search problem could be terminated when the Deviation reaches a certain accepted value (e.g. 10%) or when the deviation cannot be decreased anymore. FIG. 3 is an overview of a system comprising an objective metric image quality controller according to the present invention. It is understood by persons of ordinary skill in the art that while the system illustrated in FIG. 3 is for explanatory purposes only, and the number of metrics, the type of model (e.g. quadratic, polynomial degree for non-linear combination to an Lth order), the type of ranking and genetic algorithms are not limited to the illustration.

As previously discussed with regard to a method of the present invention, the video sequence is weighted, scored by each metric, and the genetic algorithm module heuristically determines the best set of weights to arrive at a quality having a highest correlation with predetermined subjective values.

As shown in FIG. 3, a receiving means 305 receives a video sequence the objective metric image quality controller 300 comprises a random set of metrics 315 ranging from 1 to n. In accordance with an aspect of the presently claimed invention, cross correlation information of the metrics is not required. Each metric has an objective scoring value, and FIG. 3 shows that the first metric has a value $x_1, x_2, \ldots x_n$. A plurality of weights ($w_1$ to $w_n$) which are used to weight each individual objective scoring value from $x_1$ to $x_n$ are supplied by the means for determining weights 320. A means for combining metrics 325 combines the weighted individual scoring into a single evaluation F. Again, while in this illustration the number of metrics is limited to four only for explanatory purposes. The set of composite objective scores is collected for the predetermined set of sequences in vector X at 335, which is a storage area. A means for ranking 345 finds the correlation factor R is for correlation of the objective evaluation F and the subjective factor Y from the predetermined plurality of video sequences. Although a Spearman rank order is disclosed as a best mode, the ranking according to the present invention is not limited to Spearman ranking. The calculating by a Spearman rank order avoids any linearity assumption in the modeling, and an example of such a ranking would be according to the following equation:

$$R = 1 - \frac{6*(X-Y)^t(X-Y)}{k(k^2-1)},$$

wherein X is equal to a vector of ranked k objective values for the k sequences (k*l), and Y is equal to a vector of ranked k subjective evaluation for the k sequences (k*1).

The means for determining the plurality of weights 320 includes genetic algorithms for heuristically searching for the best set of weights, by changing the values of the weight factors to maximize the correlation with the subjective values. Maximizing the correlation means providing a correlation as close to unity as possible. As previously discussed, the search may be terminated when the deviation is within a certain accepted value, or when it cannot be decreased anymore.

What is claimed is:

1. A method for providing a composite objective image quality metric of a set of a plurality of random video features, said method comprising the steps of:
   (a) receiving a video sequence for image quality evaluation;
   (b) providing an objective metric image quality controller comprising a random set of metrics ranging from $M_1$ to $M_n$ without cross correlation information;
   (c) applying said each one metric of said set of metrics individually to said video sequence so that said each one metric of said random set of metrics provides an individual objective scoring value of said video sequence ranging from $x_1$ to $x_n$;
   (d) determining a plurality of sets of weights ($w_1$ to $w_n$) which correlate to predetermined subjective evaluations of image quality for a predetermined plurality of video sequences (n), each one set of weights of said plurality of sets of weights being assigned a range having an incremental value equal to said range divided by a number of combinations for said each one set of weights;
   (e) weighting by said each one set of weights each individual objective scoring value $x_1$ to $x_n$ provided by said each one metric of said random set of metrics in step (c);
   (f) adding the weighted individual objective scoring values of said random set of metrics into a single objective evaluation F, wherein each weighted individual scoring value from step (e) is multiplied by each individual objective scoring value $x_1$ to $x_n$ from step (c);
   (g) calculating a correlation factor R to provide a correlation value for the objective evaluation F and the plurality of video sequences (n);
   (h) repeating steps (e), (f) and (g) for each set of weights provided in step (d) to determine a plurality of correlation factors R;
   (i) ranking said plurality of correlation factors R, wherein a particular correlation factor of said plurality of correlation factors having a particular correlation value closest to 1 represents a best ranking of the respective combined metrics in step (e) for each set of weights; and
   (j) providing image quality information to at least one of a system optimizer and the video processing module as to the best ranking of the respective combined metrics obtained in step (i) to provide a best perceptual image quality.

2. The method according to claim 1, where the combining recited in step (f) is performed non-linearly by a quadratic model to obtain the objective evaluation F.

3. The method according to claim 2, wherein when a number of the set of metrics =4, then the quadratic model to obtain the objective evaluation F is:

$$F = w_1 x_1^2 + w_2 x_2^2 + w_3 x_3^2 + w_4 x_4^2 + w_5 x_1 x_2 + w_6 x_1 x_3 + w_7 x_1 x_4 + w_8 x_2 x_3 + w_9 x_2 x_4 + w_{10} x_3 x_4.$$

4. The method according to claim 2, wherein when a number of the sets of metrics=n, then the quadratic model to obtain the objective evaluation F is:

$$F = \left(\sum_{i=1}^{n} w_i x_i\right)^2,$$

wherein "n" is a non-zero value.

5. The method according to claim 1, wherein a number of sets of metrics=n, and step (f) includes using a polynomial degree for non-linear combination to an Lth order, and said objective evaluation F is obtained according to:

$$F = \left(\sum_{i=1}^{n} w_i x_i\right)^L$$

, wherein "n" is a non-zero value.

6. The method according to claim 1, wherein the calculating of the correlation factor R in step (g) is performed by using a Spearman rank order comprising the following equation:

$$R = 1 - \frac{6*(X-Y)^t(X-Y)}{k(k^2-1)},$$

wherein X is equal to a vector of ranked k objective values for the k sequences (k*1), and Y is equal to a vector of ranked k subjective evaluation for the k sequences (k*1).

7. The method according to claim 2, wherein the calculating of the correlation factor R in step (g) is performed by using a Spearman rank order comprising the following equation:

$$R = 1 - \frac{6*(X-Y)^t(X-Y)}{k(k^2-1)},$$

wherein X is equal to a vector of ranked k objective values for the k sequences (k*1), and Y is equal to a vector of ranked k subjective evaluation for the k sequences (k*1).

8. The method according to claim 4, wherein the calculating of the correlation factor R in step (g) is performed by using a Spearman rank order comprising the following equation:

$$R = 1 - \frac{6*(X-Y)^t(X-Y)}{k(k^2-1)},$$

wherein X is equal to a vector of ranked k objective values for the k sequences (k*1), and Y is equal to a vector of ranked k subjective evaluation for the k sequences (k*1).

9. The method according to claim 1, wherein said method further comprises the step of:
(k) selecting a best set of weights from the plurality of sets of weights provided in step (d), said best set of weights being heuristically determined by a genetic algorithm that increases dynamically a size of the assigned range of said each one set of weights provided in step (d).

10. The method according to claim 1, wherein said method further comprises the step of: (k) selecting a best set of weights from the plurality of sets of weights provided in step (d), said best set of weights being heuristically determined by a genetic algorithm that that enables finding the best solution that maximizes the correlation factor R of the overall objective image quality F with the subjective evaluation without performing an exhaustive search to find the best set of weights.

11. The method according to claim 2, wherein said method further comprises the step of:
(k) selecting a best set of weights from the plurality of sets of weights provided in step (d), said best set of weights being heuristically determined by a genetic algorithm that increases dynamically a size of the assigned range of said each one set of weights provided in step (d).

12. The method according to claim 2, wherein said method further comprises the step of:
(k) selecting a best set of weights from the plurality of sets of weights provided in step (d), said best set of weights being heuristically determined by a genetic algorithm that enables finding the best solution that maximizes the correlation factor R of the overall objective image quality F with the subjective evaluation without performing an exhaustive search to find the best set of weights.

13. The method according to claim 7, wherein said method further comprises the step of:
(k) selecting a best set of weights from the plurality of sets of weights provided in step (d), said best set of weights being heuristically determined by a genetic algorithm that increases dynamically a size of the assigned range of said each one set of weights provided in step (d).

14. The method according to claim 7, wherein said method further comprises the step of:
(k) selecting a best set of weights from the plurality of sets of weights provided in step (d), said best set of weights being heuristically determined by a genetic algorithm that that enables finding the best solution that maximizes the correlation factor R of the overall objective image quality F with the subjective evaluation without performing an exhaustive search to find the best set of weights.

15. The method according to claim 9, wherein said genetic algorithm comprises a chromosome having a number of genes corresponding to quantity of said plurality of sets of weights in step (d), and each gene of said number of genes being represented by a quantity of bits sufficient to represent all possible tested values for said each one weight in binary, wherein all possible tested values being equal to an absolute value of the assigned range for said each one set of weights provided in step (d) divided by the incremental value for said each one set of weights.

16. The method according to claim 15, wherein said genetic algorithm alters a bit pattern of said chromosome by at least one of mutation and crossover while minimizing a deviation in the correlation factor R, so that a best solution comprises a deviation closest to zero.

17. The method according to claim 10, wherein said genetic algorithm comprises a chromosome having a number of genes corresponding to quantity of said plurality of sets of weights in step (d), and each gene of said number of genes being represented by a quantity of bits sufficient to represent all possible tested values for said each one weight in binary, wherein all possible tested values being equal to a value of the assigned range for said each one set of weights provided in step (d) divided by the incremental value for said each one set of weights.

18. The method according to claim 17, wherein said genetic algorithm alters a bit pattern of said chromosome by at least one of mutation and crossover while minimizing a deviation in the correlation factor R, so that a best solution comprises a deviation closest to zero.

19. The method according to claim 17, wherein said genetic algorithm alters a bit pattern of said chromosome by at least one of mutation and crossover while minimizing a deviation in the correlation factor R, so that a best solution comprises one of 1) the deviation within a predetermined percentage of a predetermined value, and 2) the deviation can not be decreased any further after a certain predetermined number of attempts.

20. The method according to claim 11, wherein said genetic algorithm comprises a chromosome having a number of genes corresponding to quantity of said plurality of sets of weights in step (d), and each gene of said number of genes being represented by a quantity of bits sufficient to represent all possible tested values for said each one weight in binary, wherein all possible tested values being equal to a value of the assigned range for said each one set of weights provided in step (d) divided by the incremental value for said each one set of weights.

21. The method according to claim 20, wherein said genetic algorithm alters a bit pattern of said chromosome by at least one of mutation and crossover while minimizing a deviation in the correlation factor R, so that a best solution comprises a deviation closest to zero.

22. The method according to claim 12, wherein said genetic algorithm comprises a chromosome having a number of genes corresponding to quantity of said plurality of sets of weights in step (d), and each gene of said number of genes being represented by a quantity of bits sufficient to represent all possible tested values for said each one weight in binary, wherein all possible tested values being equal to a value of the assigned range for said each one set of weights provided in step (d) divided by the incremental value for said each one set of weights.

23. The method according to claim 22, wherein said genetic algorithm alters a bit pattern of said chromosome by at least one of mutation and crossover while minimizing a deviation in the correlation factor R, so that a best solution comprises a deviation closest to zero.

24. The method according to claim 13, wherein said genetic algorithm comprises a chromosome having a number of genes corresponding to quantity of said plurality of sets of weights in step (d), and each gene of said number of genes being represented by a quantity of bits sufficient to represent all possible tested values for said each one weight in binary, wherein all possible tested values being equal to a value of the assigned range for said each one set of weights provided in step (d) divided by the incremental value for said each one set of weights.

25. The method according to claim 24, wherein said genetic algorithm alters a bit pattern of said chromosome by at least one of mutation and crossover while minimizing a deviation in the correlation factor R, wherein the deviation =1−R, and a best solution determined by said algorithm comprises a deviation closest to zero.

26. The method according to claim 13, wherein said genetic algorithm comprises a chromosome having a number of genes corresponding to quantity of said plurality of sets of weights in step (d), and each gene of said number of genes being represented by a quantity of bits sufficient to represent all possible tested values for said each one weight in binary, wherein all possible tested values being equal to a value of the assigned range for said each one set of weights provided in step (d) divided by the incremental value for said each one set of weights, and wherein said genetic algorithm alters a bit pattern of said chromosome by at least one of mutation and crossover while minimizing a deviation in the correlation factor R, wherein the deviation =1−R, and a best solution determined by said algorithm comprises a deviation closest to a predetermined value.

27. The method according to claim 26, wherein said predetermined value comprises a value that cannot be reduced by further search.

28. The method according to claim 24, wherein said genetic algorithm alters a bit pattern of said chromosome by at least one of mutation and crossover while minimizing a deviation in the correlation factor R, wherein the deviation =1−R, and a best solution determined by said algorithm comprises a deviation closest to a predetermined value.

29. A system for providing a composite image of a random set of video features comprising:

means for receiving a video sequence;

an objective metric image quality controller comprising a plurality of objective metrics without prior dependency information thereof, means for selecting a metric from said plurality of objective metrics for evaluating image quality of the video sequence, and means for applying each of said plurality of objective metrics by said objective metric image quality controller to said video sequence and individually scoring said video sequence from $x_1$ to $x_n$;

means for determining a plurality of sets of weights ($w_1$ to $w_n$) by said objective metric image quality controller, said plurality of sets of weights correlate to predetermined subjective evaluations of image quality for a predetermined plurality of video sequences (n), each one set of weights being assigned a range having an incremental value equal to a value of said range divided by a number of combinations for said each one set of weights, which includes means for weighting by said each one set of weights each individual objective scoring value $x_1$ to $x_n$ provided by said each one metric of a random set of metrics;

means for combining metrics of the weighted individual objective scoring values of said random set of metrics corresponding to the random set of video features into a single objective evaluation F, wherein each weighted individual scoring value is multiplied by a corresponding weight; and means for calculating a plurality of correlation factors R to provide a correlation value for the objective evaluation F and the plurality of video sequences (n), which includes means for ranking said plurality of correlation factors R, wherein a particular correlation factor of said plurality of correlation factors having a particular correlation value closest to 1 represents a best ranked respective combined metrics for each set of weights, wherein the best ranked respective combined metrics determined by said objective metric image quality controller is used to provide a best objective perceptual quality of said video sequence.

30. The system according to claim 29, wherein said means for combining metrics includes means for non-linear combination by a quadratic model to obtain the objective evaluation F.

31. The system according to claim 29, wherein said means for combining metrics includes means for non-linear combination by a polynomial degree to an Lth order, and a number of sets of metrics=n, to obtain the objective evaluation F according to:

$$F = \left(\sum_{i=1}^{n} w_i x_i\right)^L$$

, wherein "n" is a non-zero value.

32. The system according to claim 30, wherein said means for calculating the plurality of correlation factors R includes using a Spearman rank order comprising:

$$R = 1 - \frac{6*(X-Y)^t(X-Y)}{k(k^2-1)},$$

wherein X is equal to a vector of ranked k objective values for the k sequences (k*1), and Y is equal to a vector of ranked k subjective evaluation for the k sequences (k*1).

33. The system according to claim 32, wherein said means for determining includes means for selecting a best set of weights from the plurality of sets of weights, said best set of weights being heuristically determined by a genetic algorithm module that increases dynamically a size of the assigned range of said each one set of weights.

34. The system according to claim 33, wherein said means for determining includes means for selecting a best set of weights from the plurality of sets of weights, said best set of weights being heuristically determined by a genetic algorithm module that enables finding the best solution that maximizes the correlation factor R of the overall objective image quality F with the subjective evaluation without performing an exhaustive search to find the best set of weights.

* * * * *